United States Patent
Dalrymple et al.

(10) Patent No.: US 7,742,206 B2
(45) Date of Patent: Jun. 22, 2010

(54) METHODS AND SYSTEMS FOR COLOR GAMUT ADJUSTMENT

(75) Inventors: John C. Dalrymple, Portland, OR (US); James Z. Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1143 days.

(21) Appl. No.: 11/053,370

(22) Filed: Feb. 8, 2005

(65) Prior Publication Data

US 2006/0176528 A1   Aug. 10, 2006

(51) Int. Cl.
*H04N 1/60* (2006.01)
(52) U.S. Cl. .............. 358/518; 358/500; 358/501; 358/520; 358/523
(58) Field of Classification Search ............ 358/1.1, 358/1.9, 2.1, 518, 520, 522, 523, 525
See application file for complete search history.

(56) References Cited

U.S. PATENT DOCUMENTS

| | | | |
|---|---|---|---|
| 4,941,038 A | 7/1990 | Walowit | |
| 5,243,414 A * | 9/1993 | Dalrymple et al. | 358/500 |
| 5,426,517 A | 6/1995 | Schwartz | |
| 5,450,216 A | 9/1995 | Kasson | |
| 5,491,568 A | 2/1996 | Wan | |
| 5,515,172 A | 5/1996 | Shiau | |
| 5,633,662 A | 5/1997 | Allen | |
| 5,731,818 A | 3/1998 | Wan et al. | |
| 5,933,253 A * | 8/1999 | Ito et al. | 358/500 |
| 5,933,256 A | 8/1999 | Ebner | |
| 5,949,967 A | 9/1999 | Spaulding et al. | |
| 5,953,499 A | 9/1999 | Narendranath | |
| 5,975,679 A | 11/1999 | Nicoloff, Jr. | |
| 6,002,806 A | 12/1999 | Morikawa | |
| 6,084,689 A | 7/2000 | Mo | |
| 6,229,915 B1 | 5/2001 | Ohkubo | |
| 6,262,744 B1 | 7/2001 | Carrein | |
| 6,282,311 B1 | 8/2001 | McCarthy et al. | |
| 6,282,313 B1 | 8/2001 | McCarthy et al. | |
| 6,342,951 B1 | 1/2002 | Eschbach et al. | |

(Continued)

FOREIGN PATENT DOCUMENTS

EP          0626781          11/1994

(Continued)

OTHER PUBLICATIONS

MacDonald, Assessing the Effects of Gamut Compression in the Reproduction of Fine Art Paintings, Proc of the IS&T/SID 1995 Color Imaging Conference: Color Science, Systems and Applications, pp. 194-199.

(Continued)

*Primary Examiner*—Twyler L Haskins
*Assistant Examiner*—Kent Yip
(74) *Attorney, Agent, or Firm*—Krieger Intellectual Property, Inc.; Scott C. Krieger (57) ABSTRACT

Embodiments of the present invention comprise methods and systems for color gamut mapping. Some embodiments comprise mapping by projecting a first gamut color point to an intermediate curvilinear construct and then projecting from the curvilinear construct to a second color gamut point. In some embodiments, gamut points are separated into regions with differing projection rules and curvilinear constructs.

1 Claim, 7 Drawing Sheets

U.S. PATENT DOCUMENTS

| | | | |
|---|---|---|---|
| 6,349,146 | B2 | 2/2002 | Roetling |
| 6,373,595 | B1 * | 4/2002 | Semba et al. ............... 358/1.9 |
| 6,384,836 | B1 | 5/2002 | Naylor, Jr. et al. |
| 6,407,825 | B1 | 6/2002 | Couwenhoven |
| 6,547,358 | B1 | 4/2003 | Tanaka |
| 6,560,356 | B1 | 5/2003 | Takahashi et al. |
| 7,190,485 | B2 | 3/2007 | Couwenhoven |
| 2001/0040998 | A1 | 11/2001 | Roetling |
| 2002/0041709 | A1 | 4/2002 | Gonsalves |
| 2003/0001851 | A1 | 1/2003 | Bushey |
| 2003/0012427 | A1 | 1/2003 | Martinez-Uriegas et al. |
| 2003/0067615 | A1 | 4/2003 | Kawakami et al. |
| 2003/0072016 | A1 * | 4/2003 | Dalrymple et al. .......... 358/1.9 |
| 2003/0117457 | A1 * | 6/2003 | Qiao ......................... 347/43 |
| 2003/0160801 | A1 * | 8/2003 | Butler ....................... 345/604 |
| 2005/0030559 | A1 | 2/2005 | Jacob |
| 2005/0073730 | A1 * | 4/2005 | Huang et al. ............... 358/518 |
| 2005/0219574 | A1 | 10/2005 | Ok |
| 2005/0248581 | A1 | 11/2005 | Choe |
| 2005/0248784 | A1 * | 11/2005 | Henley et al. ............... 358/1.9 |
| 2006/0012811 | A1 | 1/2006 | Dalrymple |
| 2007/0070468 | A1 | 3/2007 | Ogawa |
| 2007/0195340 | A1 | 8/2007 | Yao |
| 2007/0195341 | A1 | 8/2007 | Yao |
| 2007/0247647 | A1 | 10/2007 | Pettigrew |

FOREIGN PATENT DOCUMENTS

| | | |
|---|---|---|
| EP | 635971 | 1/1995 |
| EP | 720352 | 7/1996 |
| EP | 730969 | 9/1996 |
| EP | 887999 | 12/1998 |
| EP | 1289268 | 3/2003 |
| EP | 1267565 | 11/2003 |
| EP | 1533994 | 5/2005 |
| EP | 1770984 | 4/2007 |
| EP | 1781014 | 5/2007 |
| JP | 2000253264 | 9/2000 |
| JP | 2005035012 | 2/2005 |
| WO | WO 96/10239 | 4/1996 |
| WO | WO97/01831 | 1/1997 |
| WO | WO99/46125 | 12/1999 |
| WO | WO 01/17233 | 3/2001 |
| WO | WO2005043507 | 5/2005 |

OTHER PUBLICATIONS

Development and Testing of a Color Space (IPT) with Improved Hue Uniformity by Fritz Ebner & Mark Fairchild, Rochester Institute of Technology.

* cited by examiner

METHODS AND SYSTEMS FOR COLOR GAMUT ADJUSTMENT

BACKGROUND OF THE INVENTION

Digital images are typically transmitted to an output device for consumption. Output devices convert a digital image to a format that can be viewed or otherwise perceived by a user. Common output devices include, but are not limited to, printers, plotters, and displays. There are many types of printers including inkjet, bubble-jet, laser and others. Many of these printers convert colored elements in a digital image to one or more elements on output media. This can be achieved by converting image elements to ink dots or toner dots applied to a printed page. Various colors are achieved by mixing or overlaying a variety of inks or toners of different colors. Many printers use three ink or toner colors consisting or cyan, magenta and yellow as well as a black ink or toner.

Display devices may also be used as output devices for digital images and as an input device. Displays may include cathode-ray tube (CRT) devices, liquid crystal display (LCD) devices, light-emitting diode (LED) devices, gas-plasma devices and many others. Display devices usually use a three-color pixel arrangement wherein red, green and blue (RGB) sub-pixels are used to create a various color elements in an image display. The luminance or some other attribute of each colored sub-pixel may be varied to achieve a wide variety of colors.

Many other mechanisms and devices may be used to output and display digital images, however due to the nature of each type of device, each one has limitations in the range of colors that it can output or display. For example, the specific ink colors and the quantity of inks used by a device can limit its output to a specific range of colors. The media on which output is generated can also affect output color. The specific nature of each pixel in a display device, such as the diode or phosphor composition and the lighting of a display can limit the range of colors displayed on these devices.

Due to these and other output device limitations, each output device is limited to a specific color range or gamut. This output device gamut may not coincide with the range of colors recorded in a digital image.

Digital images may be recorded through the use of a variety of input devices, such as scanners or digital cameras. These devices typically use a coupled-charge device (CCD) or a similar device that records an array of data that represents color and intensity values for a matrix of image elements. The nature of the scene being photographed or original being scanned, together with that of the input device, will dictate the color range or gamut of the digital image itself.

Due to the different nature of input and output devices and the many different types of devices, the gamut of the input device rarely matches the gamut of the output device. When the output device gamut does not precisely match the image gamut, the image must be rendered in a way that maps each color in the image to a color within the gamut of the output device. This process may be referred to as gamut mapping.

A display may be considered an "input" device from the viewpoint of gamut mapping. When trying to make a printed rendering of an image that we see on a display, this is the common case. Often, there are colors that can be displayed by the monitor but can't be printed.

Gamut mapping may be achieved by a process called "clipping." Various techniques may be used for clipping, but, generally, a color that falls outside the output device gamut will be mapped to a color on the surface of the output device gamut.

Another known method of gamut mapping is referred to as "compressing" the image gamut. Again, various methods may be used, but, typically, when the gamut of an image is larger than the gamut of the output device, the entire range of a particular image color or hue is compressed into the range of values producible by the output device. This may render relative image gradations better than clipping, but may do so at a cost of decreased color saturation.

BRIEF SUMMARY OF THE INVENTION

Embodiments of the present invention comprise methods and systems for color gamut mapping wherein image colors that fall outside the output device gamut are projected onto an intermediate construction line or surface and then reflected onto the boundary of the output device gamut.

The foregoing and other objectives, features, and advantages of the invention will be more readily understood upon consideration of the following detailed description of the invention taken in conjunction with the accompanying drawings.

DETAILED DESCRIPTION OF PREFERRED EMBODIMENTS

Colors in digital images may be expressed in the form of coordinates in a color space. A color space is typically a multi-dimensional coordinate system in which the orthogonal or other directions represent specific color characteristics. Typically, three-dimensional spaces are used because the human visual system is inherently trichromatic. That is, the human visual system has three types of receptors, each type being sensitive to a particular band of wavelengths. Three-dimensional spaces are also easy to visualize and generally define colors in sufficient detail.

Figure 1:
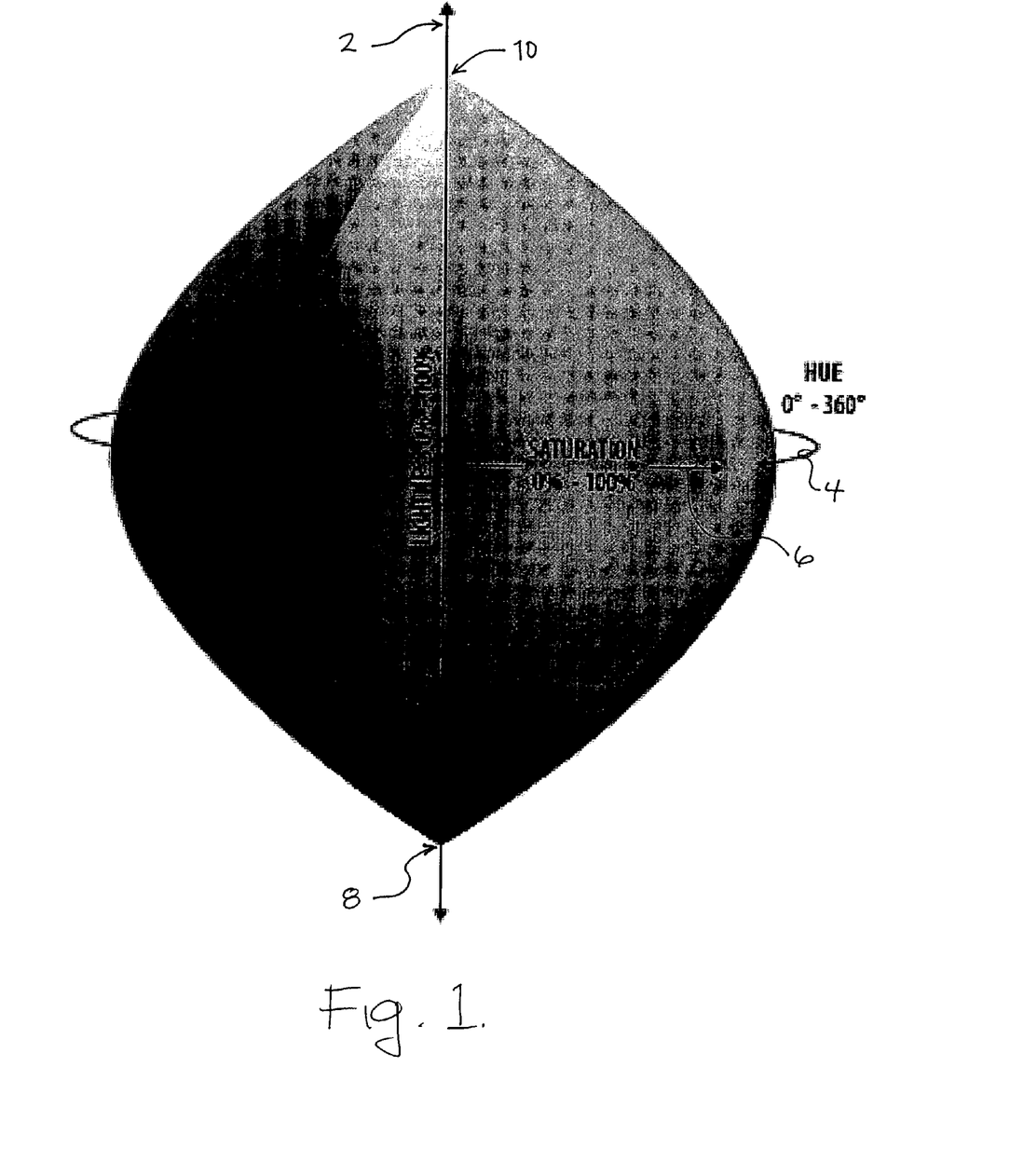
FIG. 1 is a diagram showing an exemplary color space.

An exemplary color space is shown in FIG. 1, where a vertical axis 2 corresponds to the lightness of the color. The angle 4 rotated around the lightness axis 2 defines the hue of the color and the distance 6 from the lightness axis defines the saturation of the color. This color space may be referred to as an HSL color space. In this space a color is completely defined by its hue, saturation and lightness. Points that lie on the lightness axis 2 correspond to gray values that range from a black point 8 to a white point 10. Points that lie within a plane defined by the lightness axis 2 and a specific hue angle 4 may be referred to as a hue leaf or hue half-plane.

FIG. 1 shows a uniform, well-rounded shape formed by the rotation of an arc. However, as discussed above, the capabilities of specific input and output devices may be limited to other less-uniform and sometimes irregular shapes that are defined by the characteristics of the device and the color-space in which the gamut is expressed.

Figure 2:
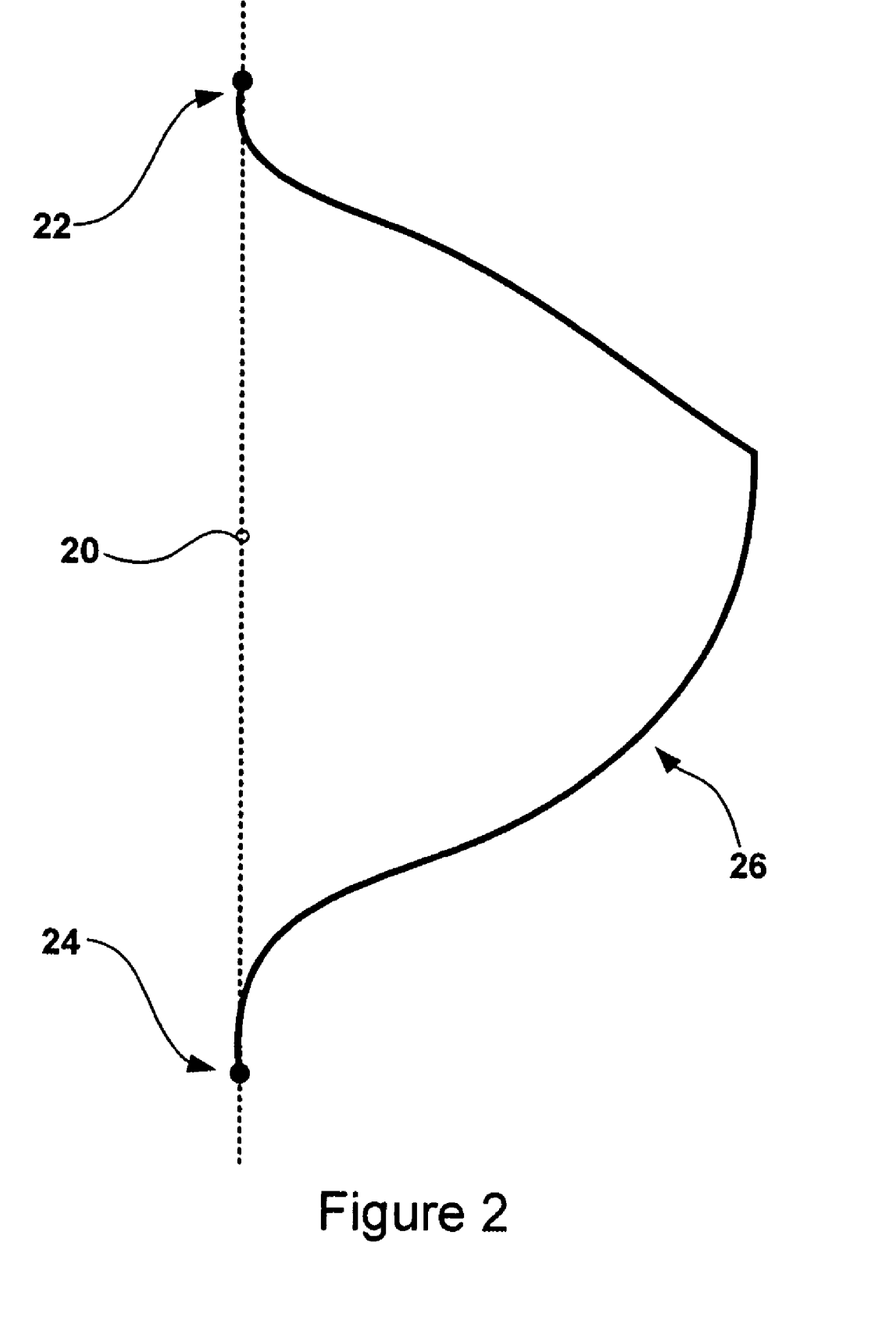
FIG. 2 is a diagram showing a device color gamut boundary surface on a hue leaf section.

FIG. 2 is a diagram of a specific hue leaf for a particular device. The lightness axis 20 is shown vertically. A device white point 22 represents the "whitest" point achievable by the device, however this device white point may not coincide with the color space white point 10 shown in FIG. 1. In some embodiments involving hard-copy media, such as printers, a white point may be determined by the spectrum of the illuminating source and the spectral response (reflectance and fluorescence) of the media (e.g., paper). This type of white point, may be called a media white point. In other embodiments comprising a display, the white point may be a property of the device itself, being produced by additive mixture of the three RGB primaries. In some embodiments, white point determination may take into account the effect of stray (flare) light.

A device black point 24 also exists on the lightness axis 2 at a point that represents the "darkest" achromatic color achievable by the device. The black point 24 may be determined as a function of stray light on the display or media or as a function of output ink or toner and output media. A curvilinear shape 26 defines the limit of the color variations that may be produced by the particular device. This curvilinear shape 26 represents the limit of the capabilities of the particular device for a specific hue and is the intersection of the half-plane of constant hue with the gamut boundary surface. It should be noted that this curvilinear shape 26, as shown in FIG. 2, may be complex and difficult or inconvenient to define mathematically. The term "curvilinear" and "curvilinear shape," as used in this specification and claims shall be interpreted broadly to encompass any shape that can be approximated by a series of points and shall not be limited to shapes defined solely with lines and curves. Accordingly, a model that simplifies this shape may facilitate the process of mapping points to locations within its gamut.

Embodiments of the present invention comprise systems and methods for mapping colors that are outside the capability range or gamut of a device to colors within that capability range or gamut. In some embodiments, explained with reference to FIG. 3, a device gamut is represented by a series of points or a curvilinear shape that defines a hue leaf boundary limit 30. At least a portion of this shape or series of points representing the hue leaf boundary limit 30 may be modeled by a curvilinear construct 32. Generally, curvilinear construct 32 is a mathematically simpler shape than hue leaf boundary limit 30. In some embodiments, curvilinear construct 32 is a line or series of lines. In other embodiments curvilinear construct 32 may be a simple curve, series of curves, a combination of lines and curves or other shapes including more complex shapes.

Figure 3:
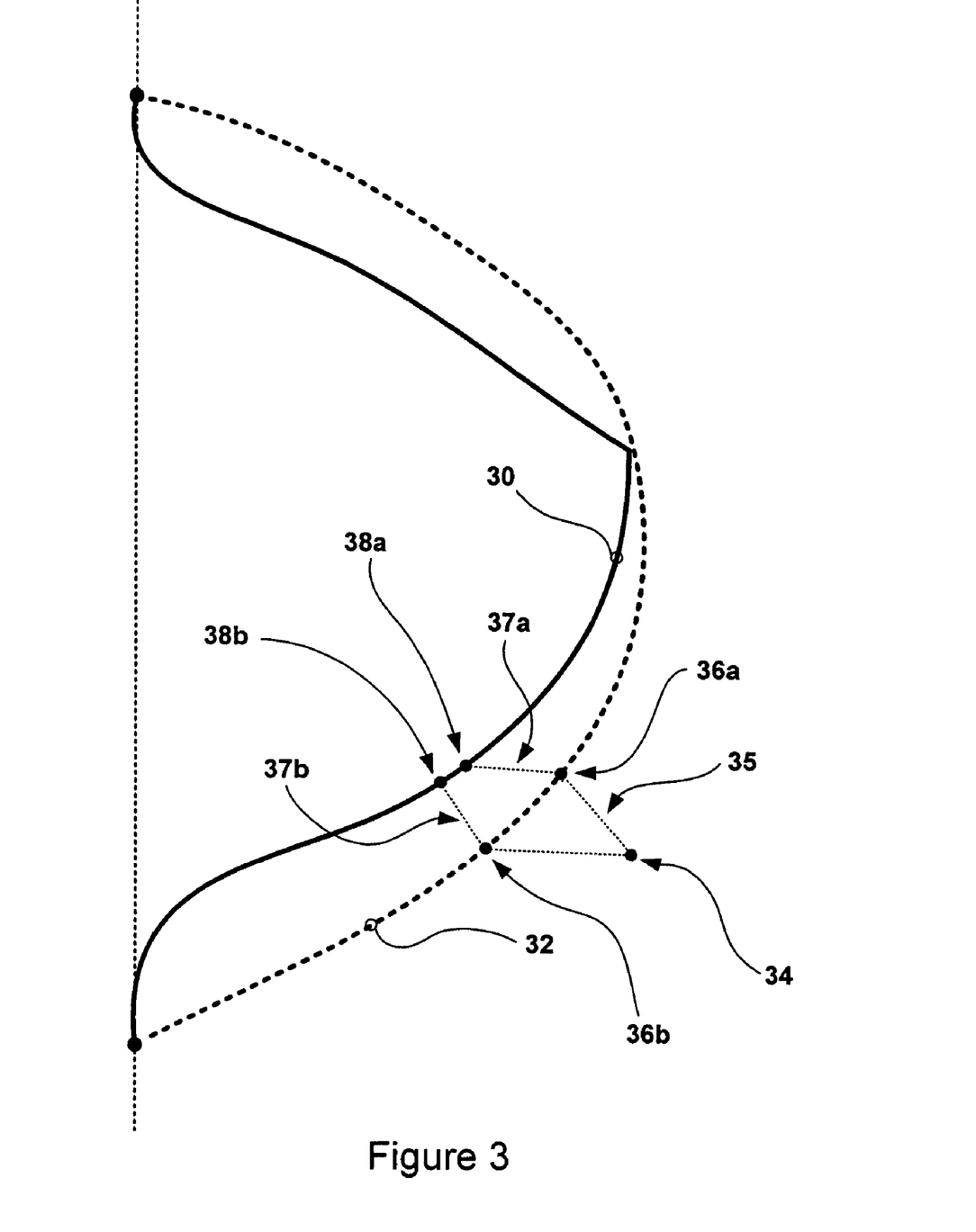
FIG. 3 is a diagram showing a device color gamut boundary surface on a hue leaf section and a curvilinear construct.

Once curvilinear construct 32 is created, a mapping process can be executed. In the mapping process of some embodiments, an out-of-gamut color point 34 is projected 35 onto curvilinear construct 32 thereby defining an initial projection point 36a. This projection 35 may be performed in a direction that is perpendicular to curvilinear construct 32. This projection 35 may also be performed in a direction of constant lightness thereby defining another initial projection point 36b. In other embodiments, the out-of-gamut color point 34 may be projected to the nearest point on curvilinear construct 32. Other projection directions may also be used.

After an initial projection point 36 has been established, this initial projection point 36 may be secondarily projected onto the hue leaf boundary limit 30 thereby defining a mapped color point 38. An initial projection point 36 may be projected in a variety of directions as explained for the initial projection 35. In some embodiments, an initial projection point, such as is shown at 36a, may be projected along a line of constant lightness 37a until it intercepts hue leaf boundary limit 30 at mapped color point 38a. In other embodiments, an initial projection point, such as is shown at 36b, may be projected 37b in a direction perpendicular to hue leaf boundary limit 30 until it intercepts hue leaf boundary limit 30 at mapped color point 38b. In still other embodiments, the initial projection point 36 may be projected to the nearest point on curvilinear hue leaf boundary limit 30. Again, many other projection directions may be used in these processes and many shapes may be used to form curvilinear construct 32 and hue leaf boundary limit 30.

Figure 4:
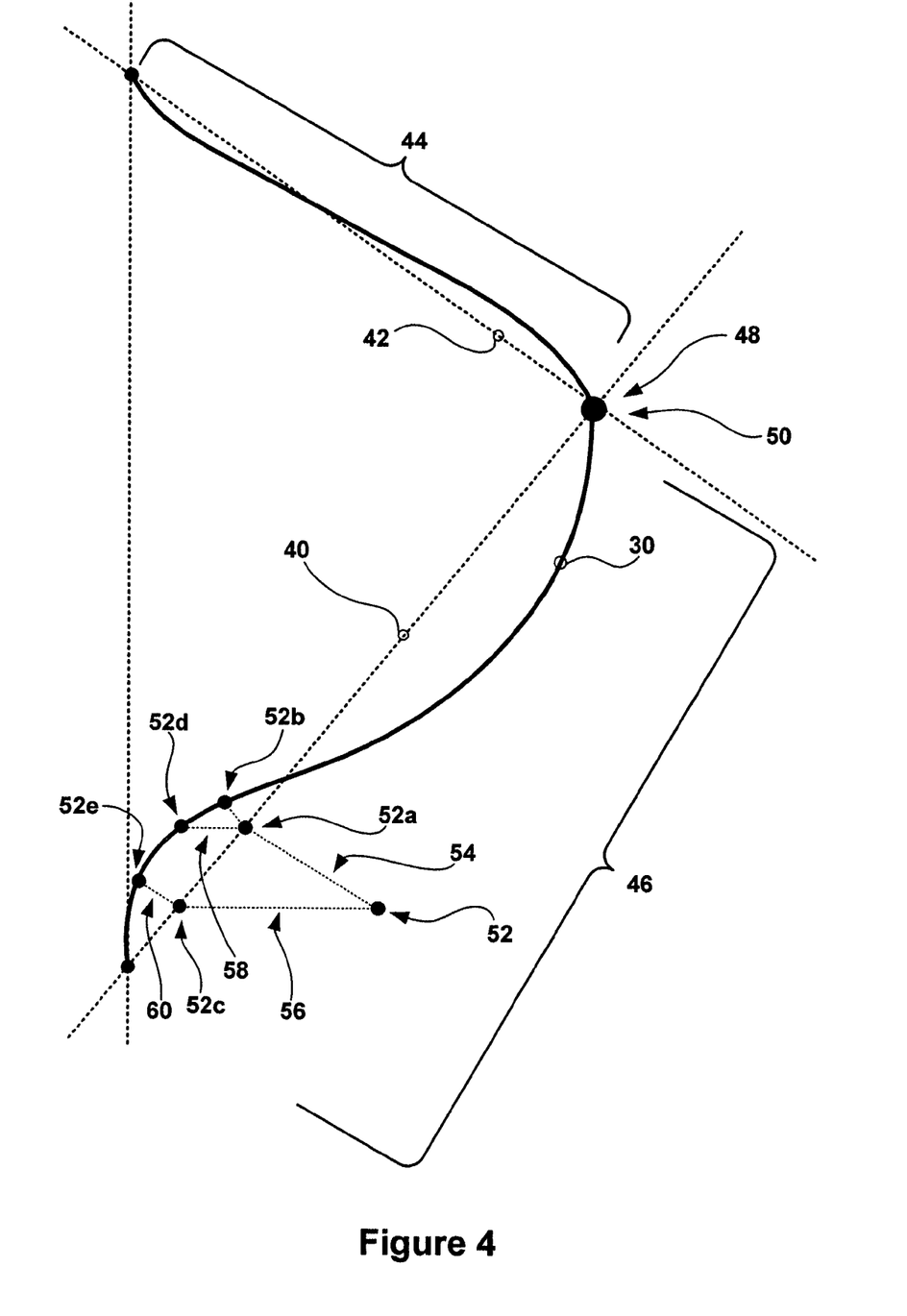
FIG. 4 is a diagram showing a device color gamut boundary surface on a hue leaf section along with linear constructs and exemplary projections.

In some embodiments of the present invention, explained with reference to FIG. 4, a device gamut may be represented by a series of points or a curvilinear shape that defines a hue leaf boundary limit 30 as explained for other embodiments above. At least a portion of this hue leaf boundary limit 30 may be modeled by a plurality of curvilinear constructs 40 & 42. Generally, curvilinear constructs 40 & 42 are mathematically simpler shapes than hue leaf boundary limit 30. In these embodiments, depicted in FIG. 4, curvilinear constructs 40 & 42 are lines. In other embodiments, curvilinear constructs 40 & 42 may be simple curves, series of curves, combinations of lines and curves or other shapes including more complex shapes. When a plurality of constructs 40 & 42 are used, hue leaf boundary limit 30 may be divided into a plurality of sections and each section may be modeled with its own construct. In the exemplary case shown in FIG. 4, a first section 44 is modeled by a first construct 42 and a second section 46 is modeled by a second construct 40. A cut point 48 is located at the intersection of the two sections 44 & 46. In some embodiments, cut points, such as cut point 48, may be located at a cusp 50 where a gamut boundary shape makes an abrupt change in slope or direction. In other embodiments, cut points may be located at points that cause the constructs to be orthogonal or at points that provide simpler or more efficiently modeled constructs.

Once curvilinear constructs 40 & 42 are created, a mapping process can be executed. In the mapping process of these embodiments, an out-of-gamut color point 52 may be projected 54 onto curvilinear construct 40 thereby defining an initial projection point 52a. This projection 54 may be performed in a direction that is perpendicular to curvilinear construct 40. This projection may also be performed in a direction of constant lightness 56 thereby defining another initial projection point 52c. Other projection directions may also be used.

After an initial projection point 52a or 52c has been established, this initial projection point 52a or 52c may be secondarily projected onto the hue leaf boundary limit 30 thereby defining a mapped color point. An initial projection point 52a may be projected in a variety of directions as explained for the initial projection 54 & 56. In some embodiments, an initial projection point, such as is shown at 52a, may be projected along a line of constant lightness 58 until it intercepts hue leaf boundary limit 30 at mapped color point 52d. In other embodiments, an initial projection point, such as is shown at 52c, may be projected 60 in a direction perpendicular to hue leaf boundary limit 30 until it intercepts hue leaf boundary limit 30 at mapped color point 52e. In still other embodiments, the initial projection point 52a or 52c may be projected to the nearest point on hue leaf boundary limit 30. Similar methods may be used to map points adjacent to other constructs, such as construct 42. Again, many other projection directions may be used in these processes.

In some embodiments of the present invention, explained with reference to FIG. 5, a device gamut may be represented by a series of points or a curvilinear shape that defines a hue leaf boundary limit 30 as explained for other embodiments above. At least a portion of this hue leaf boundary limit 30 may be modeled by a plurality of curvilinear constructs 70, 72 & 74. In these embodiments, depicted in FIG. 5, curvilinear constructs 70 & 74 are lines and curvilinear construct 72 is a curve. When a plurality of constructs 70, 72 & 74 are used, hue leaf boundary limit 30 may be divided into a plurality of sections and each section may be modeled with its own construct. In the exemplary case shown in FIG. 5, a first section is modeled by a first construct 70, a second section is modeled by a second construct 72 and a third section is modeled by a third construct 74. Cut points 76 and 78 are located at the intersection of the sections. In these embodiments, cut points 76 & 78 may be located at points spaced back from a cusp 80 where a gamut boundary shape makes an abrupt change in slope or direction. In this manner, a curve 72 may be fitted to the cusp area.

Once curvilinear constructs 70, 72 & 74 are created, a mapping process can be executed. With multiple constructs, the out-of-gamut area may be divided into regions 82-90 that are adjacent to each of the constructs 70, 72 & 74 or adjacent to points 76, 78, 92 & 94 on the hue leaf boundary limit 30 or adjacent to construct 70, 72 & 74 endpoints or intersections. Each region 82-90 may be associated with different gamut mapping rules that may define projection parameters, direct point assignments and other rules.

Each region 82-90 may be partially or fully defined by regional boundaries 96-102, 106 & 108. These boundaries 96-102, 106 & 108 may be generated as projections that are perpendicular to curvilinear constructs 70-74, as shown in FIG. 5. These regional boundaries 96-102, 106 & 108 may also be extensions of color space axes, such as the lightness axis 104 or other axes. Regional boundaries 96-102, 106 & 108 may also be generated by orthogonal projections or projections in other directions from cut points or other locations on curvilinear constructs 70-74.

Figure 5:
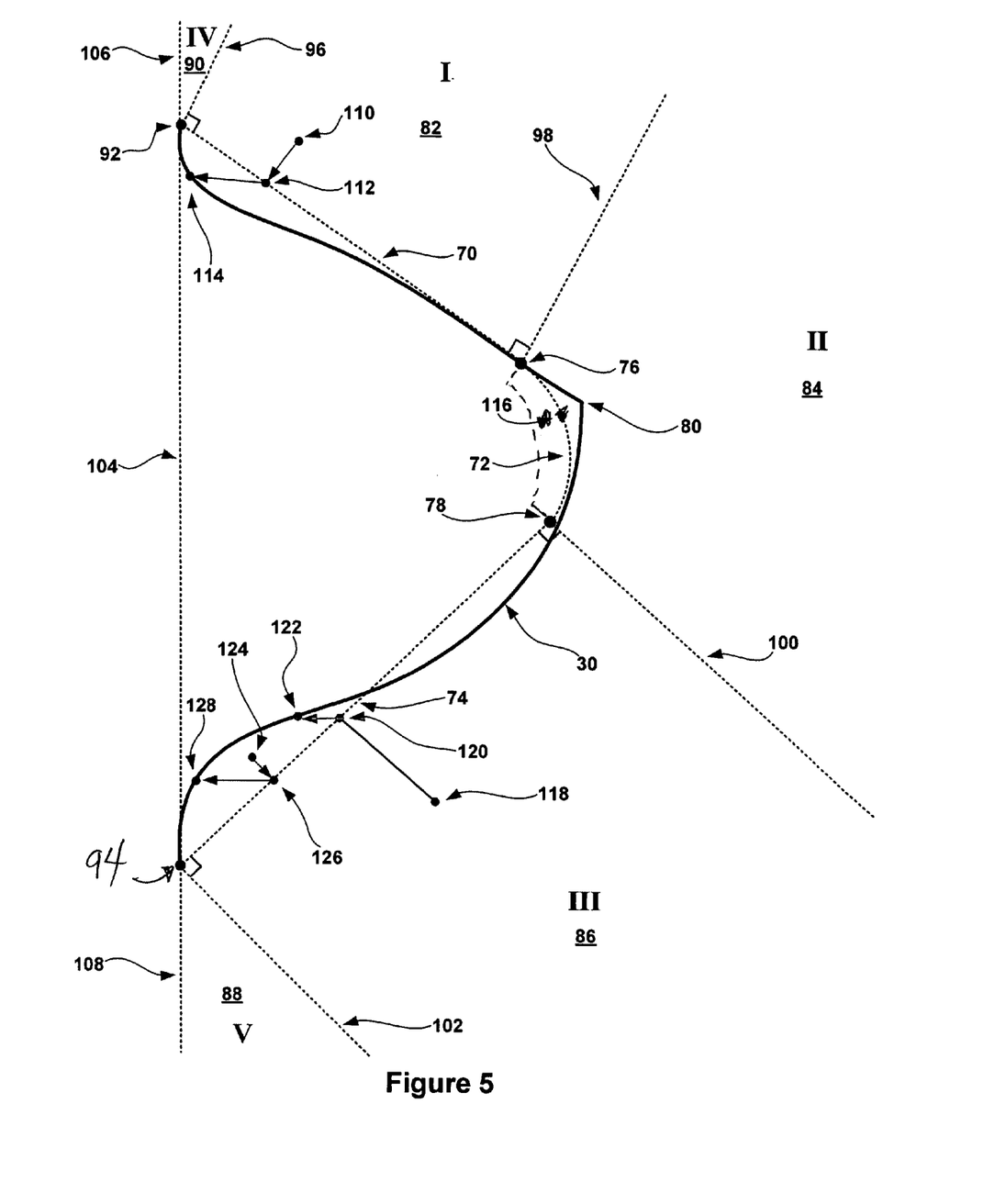
FIG. 5 is a diagram showing a device color gamut boundary surface on a hue leaf section along with multiple curvilinear constructs and exemplary projections.

As an example of regional gamut mapping rules, in the embodiments depicted in FIG. 5, points that lie within region IV 90, which is situated between an extension 106 of the lightness axis 104 and a first regional boundary 96, may be mapped directly to the device white point 92. In this example, all points in region IV 90 are mapped to a single point 92. In other embodiments, points that lie within a region, such as region IV 90, may be mapped or compressed into an area within the hue leaf boundary limit 30.

As another example, points that lie within region I 82, such as point 110, may be projected onto an adjacent curvilinear construct 70. This projection may be performed in a perpendicular direction, a direction of constant brightness or some other direction. Once this point is projected onto construct 70 thereby defining an initial projection point 112, the initial projection point 112 may also be projected onto hue leaf boundary limit 30 thereby defining a mapped color point 114. This projection may also be performed in a variety of directions as explained above.

In another regional mapping example, points that lie within region II 84, adjacent to curve construct 72, may be projected onto construct 72 and secondarily projected onto hue leaf boundary limit 30 or mapped to a region within hue leaf boundary limit 30. Alternatively, points in this region may be projected or mapped to a single point or a series of points on construct 72 and then to hue leaf boundary limit 30. In some embodiments, points in some regions may be directly mapped to points on the hue leaf boundary limit 30 or to points that lie in an area within the hue leaf boundary limit 30.

In some embodiments, out-of-gamut points that lie within region II 84 may be "compressed" into an "in-gamut" region, such as in-gamut regions 116. The location of the final color mapped point within the in-gamut region 116 may be determined based on the distance from the original out-of-gamut point to the construct 72 or the hue leaf boundary limit 30 or by some other parameters.

As yet another regional mapping example, points that lie within region III 86, such as point 118, may be projected onto an adjacent curvilinear construct 74. This projection may be performed in a perpendicular direction, a direction of constant brightness or some other direction. Once this point is projected onto construct 74 thereby defining an initial projection point 120, the initial projection point 120 may also be projected onto hue leaf boundary limit 30 thereby defining a mapped color point 122. This projection may also be performed in a variety of directions as explained above. Likewise, a point lying between construct 74 and hue leaf boundary limit 30, such as point 124, may be projected outwardly on to construct 74 thereby defining an initial projection point 126 and re-projected back to hue leaf boundary limit 30 thereby defining a color mapped point 128.

As an additional example of regional gamut mapping rules, in the embodiments depicted in FIG. 5, points that lie within region V 88, which is situated between an extension 108 of the lightness axis 104 and a regional boundary 102, may be mapped directly to the device black point 94. In this example, all points in region V 88 may be mapped to a single point 94. In other embodiments, points that lie within a region, such as region V 88, may be compressed into an area on or within the hue leaf boundary limit 30.

In still further embodiments of the present invention, explained with reference to FIG. 6, a device gamut may be represented by a series of points or a curvilinear shape that defines a hue leaf boundary limit 30 as explained for other embodiments above. At least a portion of this hue leaf boundary limit 30 may be modeled by a plurality of curvilinear constructs 152 & 154. In these embodiments, depicted in FIG. 6, curvilinear constructs 152 & 154 are lines. When these constructs 152 & 154 are used, hue leaf boundary limit 30 is divided into two sections and each section is modeled with its own construct. In this exemplary case shown in FIG. 6, a first section 160 is modeled by a first construct 152 and a second section 161 is modeled by a second construct. A cut point 156 is located at the intersection of the sections 160 & 161. In these embodiments, a cut point may be located at a cusp 220, where a gamut boundary shape makes an abrupt change in slope, at a point 156 spaced back from a cusp 220, or at some other location on, outside or within hue leaf boundary limit 30.

Once cut point 156 has been chosen, a white point 162 may also be selected. Generally, white point 156 will correspond to the "lightest" achromatic color that the device is capable of rendering often taking into account any media used by the device and the effects of light sources. However, device limitations and user preferences may be used to adjust this point. A black point 158 is also selected and this point generally will correspond to the "color" of lowest achromatic lightness or "blackest" color that a device is capable of rendering or a similar point. Again, this point may be adjusted as needed for specific purposes. A white point or black point need not necessarily lie on the color space lightness axis.

These three points, the white point 162, the cut point 156 and the black point 158 may be used to define linear constructs 152 & 154. In some embodiments, a first linear construct will be defined by a line intersecting white point 162 and cut point 156 and a second linear construct will be defined by a line intersecting cut point 156 and black point 158.

Once constructs have been defined, out-of-gamut regional boundaries may be established and gamut mapping rules may be established. With these constructs, the out-of-gamut area may be divided into regions I-V 132-140 that are adjacent to each of the constructs 152 & 154 or adjacent to points 162, 156 & 158 on the hue leaf boundary limit 30. Each region 132-140 may be associated with different gamut mapping rules that may define projection parameters, direct point assignments and other rules.

Each region 132-140 may be partially or fully defined by regional boundaries 144-150, 214 & 216. These boundaries 144-150, 214 & 216 may be generated as projections that are perpendicular to linear constructs 152 & 154, as shown in FIG. 6. In the embodiments shown in FIG. 6, a first regional boundary 144 is a line projected from white point 162 in a direction perpendicular to first linear construct 152. A second regional boundary 146 is a line projected from cut point 156 in a direction perpendicular to first linear construct 152. A third regional boundary 148 is a line projected from cut point 156 in a direction perpendicular to second linear construct 154. A fourth regional boundary 150 is a line projected from black point 158 in a direction perpendicular to second linear construct 154. Regional boundaries 214 & 216 may be projections of color space axes, such as the lightness axis 142 or other axes. Regional boundaries 144-150, 214 & 216 may also be generated by orthogonal projections or projections in other directions from cut points or other locations on linear constructs 152 & 154.

When regions have been established, gamut mapping rules may be assigned to each region. As an example of regional gamut mapping rules, in the embodiments depicted in FIG. 6, points that lie within region IV 140, which is situated between an extension 216 of the lightness axis 142 and a first regional boundary 144, may be mapped directly to the device white point 162. In this example, all points in region IV 90 are mapped to a single point 162. In other embodiments, points that lie within a region, such as region IV 140, may be compressed into an area on or within the hue leaf boundary limit 30.

As another mapping rule example, points that lie within region 1 132, such as point 163, may be projected onto an adjacent linear construct 152. This projection may be performed in a perpendicular direction, a direction of constant brightness or some other direction. Once this point is projected onto construct 152 thereby defining an initial projection point 166, the initial projection point 166 may also be projected onto hue leaf boundary limit 30 thereby defining a mapped color point 168. This projection may also be performed in a variety of directions as explained above.

In another regional mapping example, points that lie within region 11 134, which is an area containing no perpendicular projections from linear constructs 152 & 154, may be mapped directly to cut point 156 on hue leaf boundary limit 30 or mapped to a region within hue leaf boundary limit 30. Alternatively, points in this region may be projected in a direction of constant lightness onto linear constructs 152 & 154.

As yet another regional mapping example, points that lie within region III 136, such as point 176, may be projected onto an adjacent linear construct 154. This projection may be performed in a perpendicular direction, a direction of constant brightness or some other direction. Once this point is projected onto construct 154 thereby defining an initial projection point 180, the initial projection point 180 may also be projected onto hue leaf boundary limit 30 thereby defining a mapped color point 184. This projection may also be performed in a variety of directions as explained above. Likewise, a point lying between construct 154 and hue leaf boundary limit 30, such as point 196, may be projected 198 outwardly onto construct 154 thereby defining an initial projection point 200 and re-projected 202 back to hue leaf boundary limit 30 thereby defining a color mapped point 204.

Figure 6:
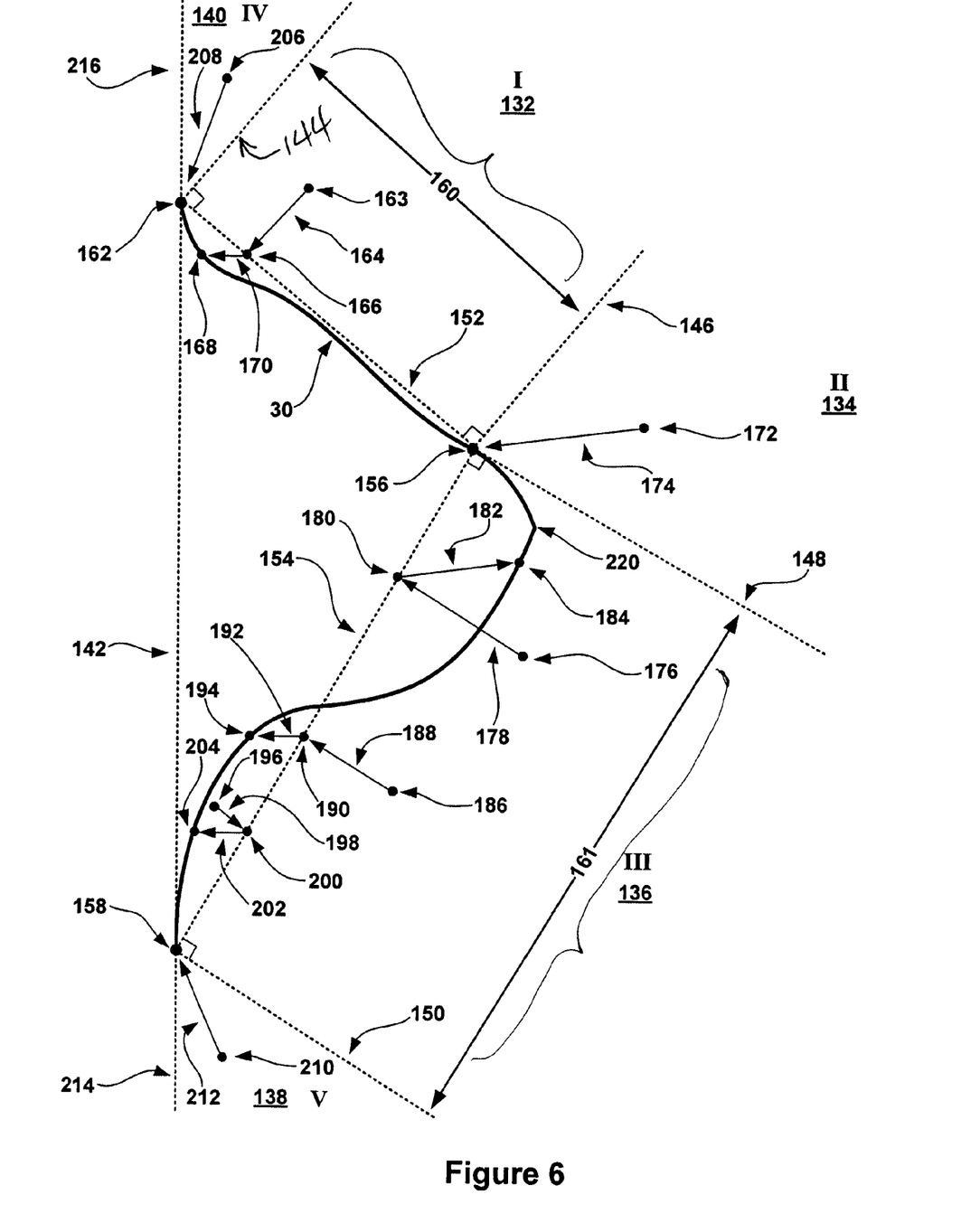
FIG. 6 is a diagram showing a device color gamut boundary surface on a hue leaf section along with simple linear constructs and exemplary projections.

As an additional example of regional gamut mapping rules, in the embodiments depicted in FIG. 6, points that lie within region V 138, which is situated between an extension 214 of the lightness axis 142 and fourth regional boundary 152, may be mapped directly to the device black point 158. In this example, all points in region V 138 may be mapped to a single point 158. In other embodiments, points that lie within a region, such as region V 138, may be compressed into a region within the hue leaf boundary limit 30

Figure 7:
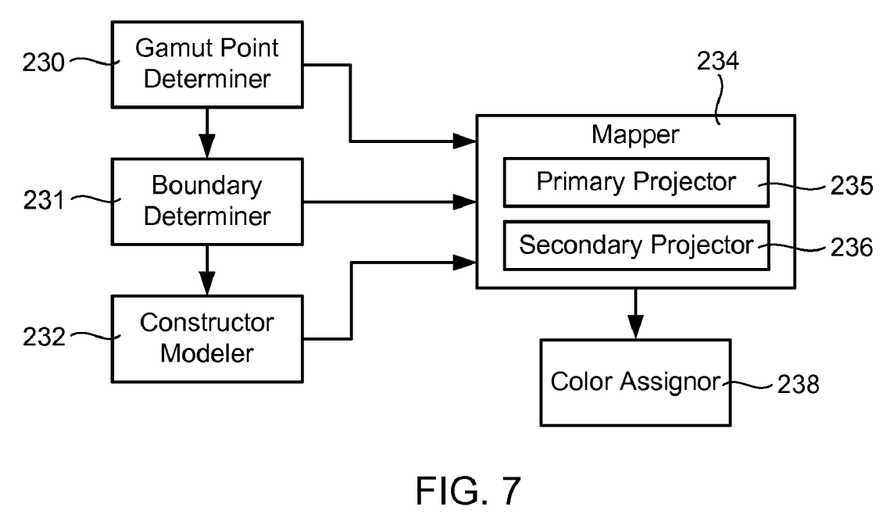
FIG. 7 is a diagram showing an exemplary apparatus for mapping a designated color that falls outside the hue leaf boundary limit to a color that is within the hue leaf boundary limit.

Some embodiments of the present invention may be described with reference to FIG. 7. In these embodiments, a gamut point determiner 230 may perform the process of determining gamut points in a color space, wherein the gamut points represent the limits of a color-rendering capability of an output device. A hue leaf boundary determiner 231 may represent at least a portion of the gamut points with at least one curvilinear shape that defines a hue leaf boundary limit. A constructor 232 may model the portion of the gamut points represented by the hue leaf boundary limit with a curvilinear construct consisting of shapes that are mathematically simpler than the curvilinear shape used to represent corresponding points in the hue leaf boundary limit. A mapper 234 may also be used to map a designated color that falls outside the hue leaf boundary limit to a color that is within the hue leaf boundary limit. This mapping process may comprise using a primary projector 235 to project a color point representing the designated color onto the curvilinear construct. The point on the curvilinear construct identified by this primary projection may then be projected, with a secondary projector 236, to a mapped color within the hue leaf boundary limit. A color assignor 238 may then be used to assign the designated color to color corresponding to the mapped color.

While the exemplary embodiments described above refer to color mapping that occurs with a single hue leaf, embodiments of the present invention comprise curvilinear constructs and color mapping processes that may map or compress an out-of-gamut color from one hue or hue leaf to another. Mapping across hue leaves will typically be minimal, however this may occur in some embodiments, particularly when color bit-depth changes or color coarseness changes in some other way. Hue shifting or hue mapping of a color from one hue leaf to another may be performed when a color is converted from an RGB display color space to a CMYK printer color space or for other reasons. Embodiments of the present invention may comprise methods and systems in which colors are mapped from an out-of-gamut point in one hue leaf to an in-gamut point in another hue leaf. These methods and systems may comprise one or multiple steps.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

We claim:

1. A method for color gamut adjustment, said method comprising:
   a) determining a plurality of gamut points in a color space, wherein said gamut points represent the limits of a color-rendering capability of an output device;
   b) representing at least a portion of said gamut points with at least one curvilinear shape that defines a hue leaf boundary limit;
   c) selecting a black point from among said gamut points that represents black;
   d) selecting a white point from among said gamut points that represents white;
   e) selecting an intermediate point from among said gamut points, wherein said intermediate point divides said gamut points into a first group and a second group;
   f) modeling said first group of gamut points with a first curvilinear construct comprising shapes that are mathematically simpler than said at least one curvilinear shape used to represent corresponding points in said hue leaf boundary limit;
   g) modeling said second group of gamut points with a second curvilinear construct, comprising shapes that are mathematically simpler than said at least one curvilinear shape used to represent corresponding points in said hue leaf boundary limit;
   h) establishing a white point regional boundary line commencing at said white point and projecting perpendicularly outwardly relative to said first construct at said white point;
   i) establishing a first intermediate point regional boundary line commencing at said intermediate point and projecting perpendicularly outwardly relative to said first construct at said intermediate point;
   j) establishing a second intermediate point regional boundary line commencing at said intermediate point and projecting perpendicularly outwardly relative to said second construct at said intermediate point;
   k) establishing a black point regional boundary line commencing at said black point and projecting perpendicularly outwardly relative to said second construct at said black point; and
   l) mapping from an input device, colors that fall outside said hue leaf boundary limit to colors within said hue leaf boundary limit of the output device by a method comprising;
      i) mapping colors in a white region, defined as the area between said white point boundary and a projection of an axis running between said black point and said white point, to the white point;
      ii) mapping colors in a black region, defined as the area between said black point boundary and a projection of an axis running between said black point and said white point, to the black point;
      iii) mapping colors in a first region, defined as the area lying between said white point regional boundary and said first intermediate point regional boundary, wherein a point representing a color is projected onto said first construct thereby defining an initial projection point, and projecting said initial projection point onto a part of said hue leaf boundary limit that corresponds to said first group of gamut points;
      iv) mapping colors in a second region, defined as the area lying between said first intermediate point regional boundary and said second intermediate point regional boundary, wherein any color in this region is mapped to said intermediate point; and
      v) mapping colors in a third region, defined as the area lying between said second intermediate point regional boundary and said black point regional boundary, wherein a point representing a color is projected onto said second construct thereby defining an initial projection point, and projecting said initial projection point onto a part of said hue leaf boundary limit that corresponds to said second group of gamut points.

* * * * *